United States Patent [19]
McMillan

[11] 4,128,298
[45] Dec. 5, 1978

[54] WAND NOSE WITH INTEGRAL LIGHT PIPE FOR WAND POWER TURN-ON

[75] Inventor: Robert M. McMillan, Dallas, Tex.

[73] Assignee: Recognition Equipment Incorporated, Dallas, Tex.

[21] Appl. No.: 754,860

[22] Filed: Dec. 27, 1976

[51] Int. Cl.² ............................. G02B 5/14; G06K 7/10
[52] U.S. Cl. .................. 350/96.10; 350/96.30; 350/96.34; 250/227; 362/32; 235/473
[58] Field of Search ................ 340/146.35, 146.3 MA; 235/61.11 E; 250/566, 227; 350/96 WG, 96 BC, 96 R; 362/28, 29, 31, 32

[56] References Cited
U.S. PATENT DOCUMENTS

| | | | |
|---|---|---|---|
| 3,357,433 | 12/1967 | Fourestier et al. | 350/96 B |
| 3,461,282 | 8/1969 | Martinez | 350/96 R |
| 3,653,739 | 4/1972 | Strack | 350/96 BC |
| 3,724,922 | 4/1973 | Jones | 350/96 R |
| 3,796,098 | 3/1974 | Trayer | 350/96 R |
| 3,813,141 | 5/1974 | Miller | 350/96 WG |
| 3,892,959 | 7/1975 | Pulles | 350/96 R |

*Primary Examiner*—John K. Corbin
*Assistant Examiner*—Rolf Hille
*Attorney, Agent, or Firm*—John E. Vandigriff

[57] ABSTRACT

Described is a light pipe for transmitting light signals to and from a transmitter/receiving sensor. The light pipe is a homogeneous body made by injection molding an arcylic plastic material.

4 Claims, 9 Drawing Figures

WAND NOSE WITH INTEGRAL LIGHT PIPE FOR WAND POWER TURN-ON

FIELD OF THE INVENTION

This invention relates to optical character recognition equipment and more particularly to a total data entry system utilized in a hand-held optical character reader.

PRIOR ART

A small hand-held optical character recognition unit capable of manual scanning of alphanumeric characters is disclosed in U.S. Pat. No. 3,947,817 and entitled "Hand Operated Optical Character Recognition Wand". An optical character recognition unit that can be used in a portable system is disclosed in U.S. Patent Application Ser. No. 505,931 filed Sept. 13, 1974 now U.S. Pat. No. 4,075,605 and entitled "Character Recognition Unit". The hand-held unit disclosed in the above patent application has been utilized in a portable optical character recognition system which is disclosed in U.S. Patent Application Ser. No. 729,530 filed Oct. 4, 1976, now U.S. Pat. No. 4,118,687 and entitled "Portable OCR Wand System". The portable system disclosed in the last mentioned patent application is light weight and may be carried from one point to another for such purposes as taking inventory of merchandise or reading labels on stored goods in order to determine the number of goods on hand. One disadvantage of the system is that it is in the form of an attache case and the user must generally stop and place the case on a table or floor while using the wand, if it is desirable to enter data into the system manually by the keyboard in instances where the data on the document or label is such that it cannot be read by the optical character reader. Also, it is inconvenient to view the information which is displayed on the console display unless it is residing flat on a table or other surface.

SUMMARY OF THE INVENTION

In accordance with the present invention, a total data entry optical character recognition wand having both a keyboard and a display mounted on the optical character unit is used in conjunction with a portable character recognition unit which is light weight and which may be carried over the shoulder in a fashion similar to a ladies purse or handbag. The system is battery operated, extremely light weight and may be moved from one point to another without difficulty. In the event the optical character recognition cannot read the data on a label or document, the user simply inputs the information via the keyboard on the wand and verifies the correct input via the display that is also on the wand.

Another feature of the total data entry wand is that it is convenient for use with either the right or left hand. The optical character reading head of the wand is reversible in that it may be rotated 180° for convenient use of the right or left hand.

The basic reading, inputting and displaying features of the wand are entirely within the hand-held unit. The optically read or keyboard inputted information is transmitted to a light weight processing unit, and is there is processed and recorded on magnetic tape for future use.

When the information is properly read, it is recorded on the cassette tape for further processing at a later time. If an item to be read is torn and smudged or is in such a condition that the information cannot be read by the optical unit, but is still human-readable, the information is entered into the system by the keyboard and this input is verified directly by the display immediately above the keyboard.

Another feature of the invention is that when the wand is to be used for example in the left hand, the read head of the wand can be rotated at a 180°. This is accomplished by lifting the head and rotating it and then allowing it to be seated against the top of the case in which the keyboard and display reside. A strain relief, rotational connection is made within the body of the reader so that the head may be rotated through the 180° without undue wear or harm to the connection between the display, keyboard and the rest of the electronics of the system.

The optical recognition unit includes illumination lamps in the nose portion thereof, which lamps are used to illuminate the material which is to be read. Also, a turn on control is incorporated in the head which turns off power to the basic electronic recognition system when the reader unit is not in use. It is necessary that an infrared signal travel from an emitter-sensor unit to the document and back to the emitter-sensor unit. To accomplish this, a light pipe is utilized in the nose portion of the reader. This light pipe makes it possible to remove the nose portion to change the illumination lamps therein without having electrical connections between the nose portion and the rest of the read head. Without the use of the light pipe, the emitter-sensor unit would have to be in the nose portion thereby requiring electrical connections between the body and the nose portion of the reader.

DESCRIPTION OF THE DRAWING

For a complete understanding of the present invention and the technical advance represented thereby, reference is now made to the following description taken in conjunction with the accompanying drawings in which;

In FIG. 1 is illustrated one embodiment of a total data entry optical character recognition wand and data entry unit according to the present invention. The hand-held unit is attached to the recognition electronics unit 2 by cable 3. The unit includes a provision for a magnetic tape cassette at 4. Switches 5 and 6 are used to turn the switch on and to control other functions of the system.

The unit 2 may be provided with a strap connected to connectors 7, one of which is illustrated.

Figure 2:
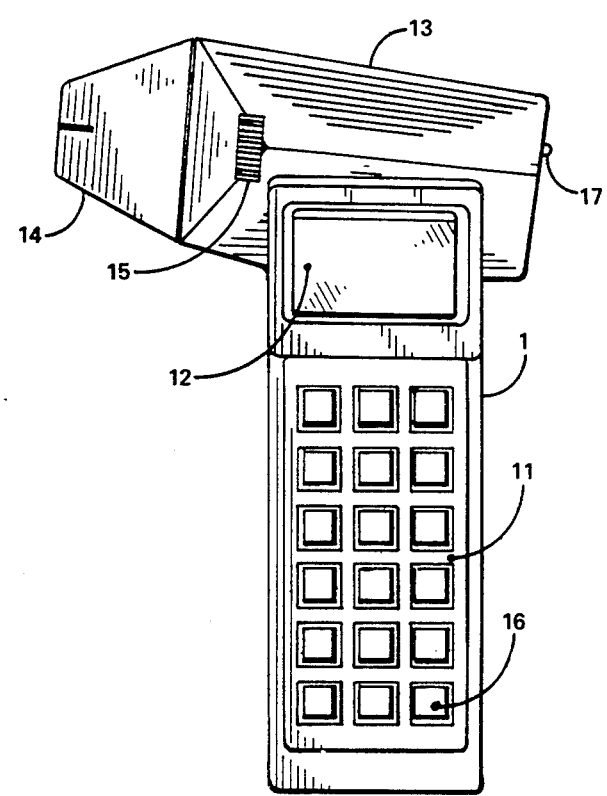
FIG. 2 is a plan view of the hand-held unit.

A more detailed drawing of the hand-held unit 1 is shown in FIG. 2. The unit consists of the read head 13 having a nose portion 14 which is attached by the rotating screw 15. Data is entered on keyboard 11 by keys 16. Information input into the system is displayed on the display 12. When the unit is in the process of reading or processing data, the display light 17 turns on showing that the system is busy.

Figure 3:
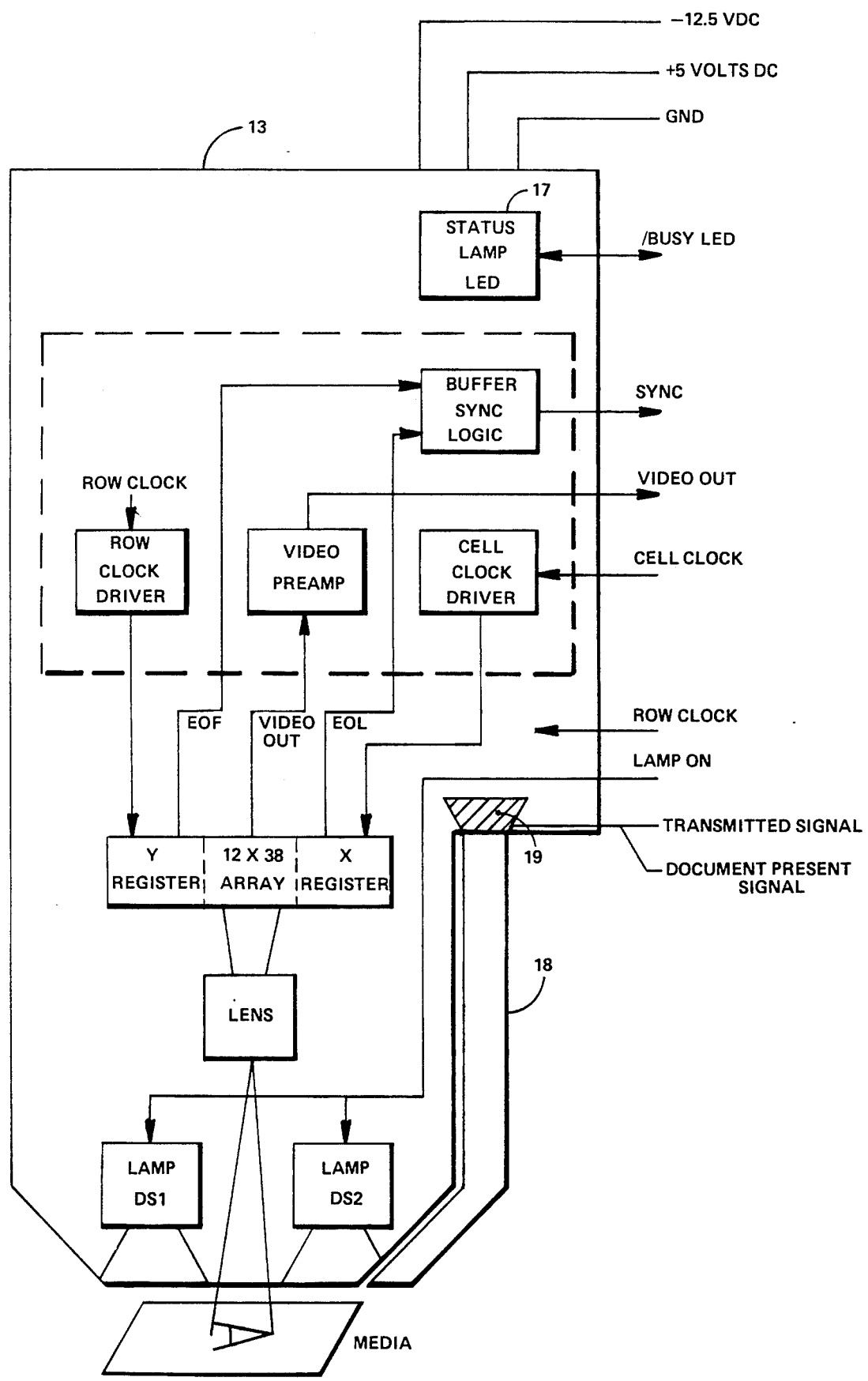
FIG. 3 is a block diagram of the basic electronics within the head portion of the hand-held unit.

The read head electronics 13 is illustrated in more detail in FIG. 3. The read head includes a 12 by 38 self scanning electronic array onto which is focused, by the lens, information read from the media which may be in the form of a document, or any printed material such as price tags, labels, etc. Lamps DS1 and DS2 illuminate the document for reading. In order to conserve energy and to turn off the power to most of the system while the read head is not actually reading a document, a control circuit is used. The emitter-sensor for the control circuit is illustrated at 19. An infrared signal is emitted from the unit 19, transmitted through the light pipe 18 to the document and reflected back through light pipe to the unit 19 if a document is being read. However, if no document is in the immediate vicinity of the read head, the infrared signal is not reflected, and the unit is not turned on. Such a control system is disclosed in U.S. Patent Application Ser. No. 729,531 filed Oct. 4, 1976.

During a read cycle, the array is continually scanned and driven by the cell clock driver and the row clock driver through the x and y registers. To synchronize the system, an end of frame signal and an end of line signal goes into a buffer sync logic unit and is sent back to the recognition electronic unit. The video output from the array is also sent back to the recognition unit. The status lamp LED 17 is on when the system is in use and data is being processed. The transmit signal line and the receive signal lines are connected to the transmit-receive unit 19 in order to transmit signals and receive reflections thereof to tell the unit to turn on when a document is being read or comes within the vicinity of the nose of the read unit.

Figure 4:
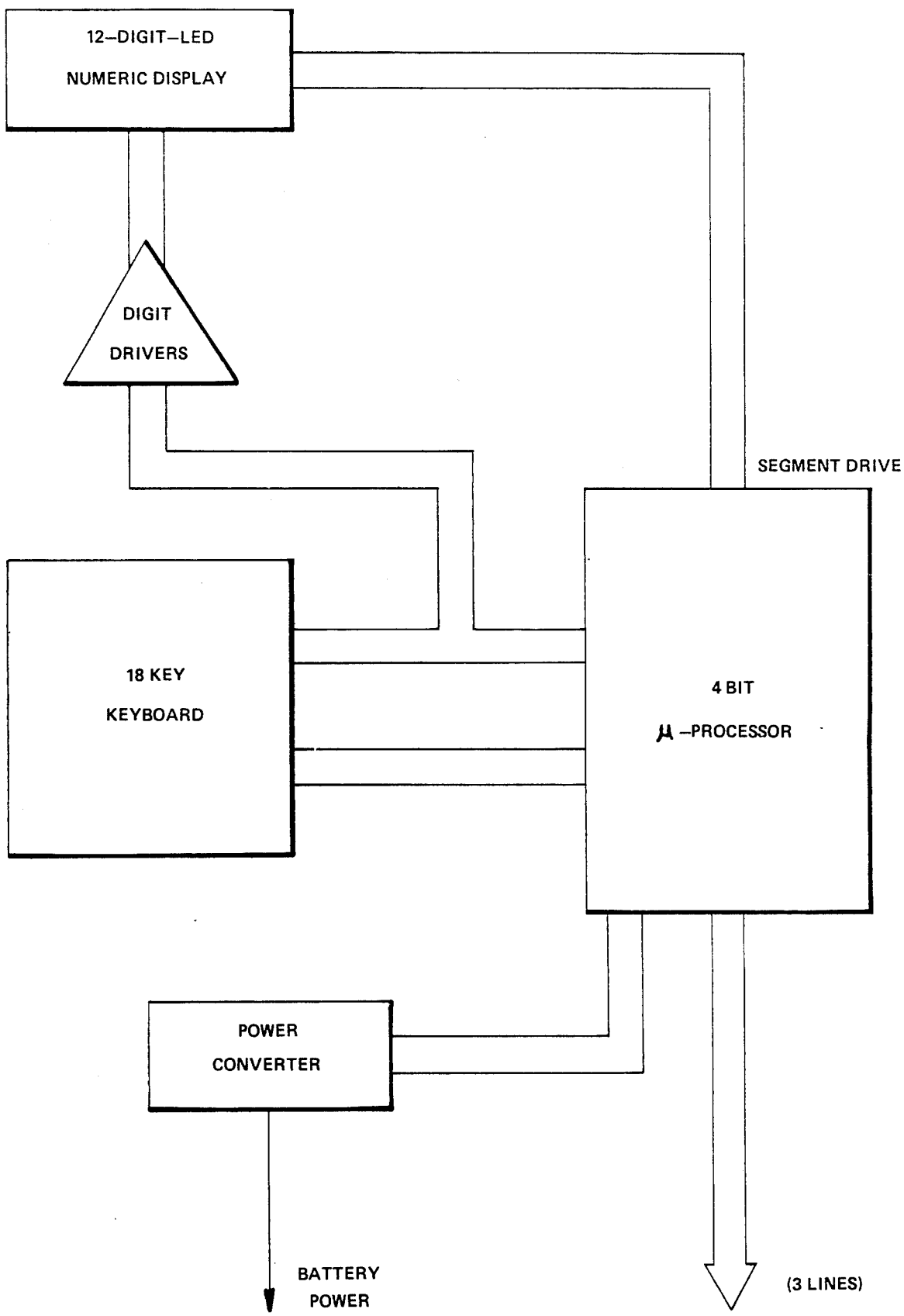
FIG. 4 is a block diagram of the keyboard and display unit.

The keyboard and display circuitry is illustrated in block form in FIG. 4. A 4 bit microprocessor is used to take the information keyed in from the keyboard and relay it back to the recognition unit electronics and in turn relay to the display the information which has been entered into the keyboard, read by the read head and processed by the recognition unit. Five lines are needed to go into the keyboard display unit. Battery power, ground and three lines which communicate between the 4 bit microprocessor and the electronics in the recognition unit.

The display and keyboard are standard available units which are commonly used in, for example, hand-held calculation. The 4 bit microprocessor may be, for example, a Texas Instruments TMS 1200 microprocessor chip.

Communication between the keyboard and display and the recognition unit 2 is accomplished with a serial message format. Recognition unit 2 includes a Fairchild F-8 microprocessor as disclosed in U.S. Patent Application Ser. No. 729, 530, field Oct. 4, 1976 now U.S. Pat. No. 4,118,687. The transfer of data from the recognition unit to the Keyboard Display unit is initiated by raising the data lines to a logic "one". The TMS 1200 located in the Keyboard Display Unit generates eight clock pulses which have a 6 millisecond period to strobe data from the recognition unit to the Keyboard Display Unit. Table 1 list the message codes which are transmitted to the TMS 1200.

Table 1

| Serial Message Format F-8 to TMS 1200 | | |
|---|---|---|
| Character/Function | MSB | LSB |
| 0 | 1000 | 0000 |
| 1 | 1000 | 0001 |
| 2 | 1000 | 0010 |
| 3 | 1000 | 0011 |
| 4 | 1000 | 0100 |
| 5 | 1000 | 0101 |
| 6 | 1000 | 0110 |
| 7 | 1000 | 0111 |
| 8 | 1000 | 1000 |
| 9 | 1000 | 1001 |
| — | 1000 | 1010 |
| A | 1000 | 1011 |
| F | 1000 | 1100 |
| E | 1000 | 1101 |
| C | 1000 | 1110 |
| (Blank) | 1000 | 1111 |
| End of Message | 1001 | XXXX |
| Recall 1 | 1010 | XXXX |
| Recall 2 | 1010 | XXXX |
| Hold Message in TMS 1200 | 1100 | 1111 |
| Release Hold | 1100 | 0000 |
| Force Attn Key | 1101 | 1111 |
| Release "Attn" Key Force | 1101 | 0000 |
| Blink Display | 1110 | XXXX |
| Clear Display | 1111 | XXXX |

X = Don't Care

Key stroke data is transmitted in an interrupt mode to the recognition unit with the MSB (most significant bit) being transmitted first. The "ATTN" key code is all "ones" and is used to "wakeup" the system during power-save cycles. The Interrupt Strobe initiates a power ON cycle which maintains power for 2 seconds after the last keystroke. Table 2 list the various key codes which are transmitted to the recognition unit.

Table 2

| Serial Message Format From TMS 1200 to F-8 | | |
|---|---|---|
| Key Number | MSB | LSB |
| 1 | 0000 | 0000 |
| 2 | 0000 | 0001 |
| 3 | 0000 | 0010 |
| 4 | 0000 | 0011 |
| 5 | 0000 | 0100 |
| 6 | 0000 | 0101 |
| 7 | 0000 | 0110 |
| 8 | 0000 | 0111 |
| 9 | 0000 | 1000 |
| 10 | 0000 | 1001 |
| 11 | 0000 | 1010 |
| 12 | 0000 | 1011 |
| 13 | 0000 | 1100 |
| 14 | 0000 | 1101 |
| 15 | 0000 | 1110 |
| ATTN | 1111 | 1111 |
| 2nd Level | 1111 | 1110 |
| 3rd Level | 1111 | 1101 |

Figure 5:
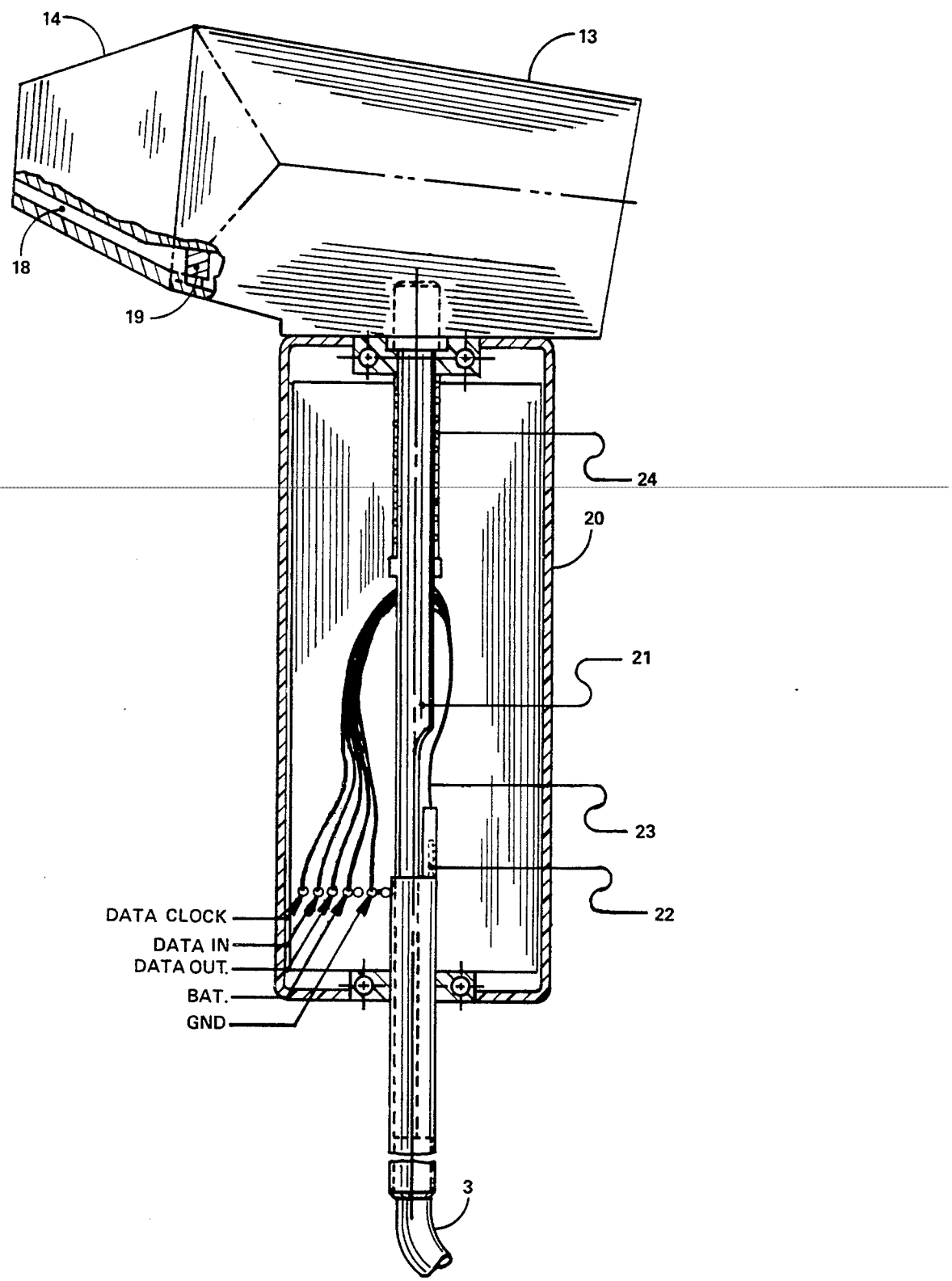
FIG. 5 is a sectional view of the hand-held unit illustrating the rotational interconnection within the body of the hand-held unit.
Figure 6:
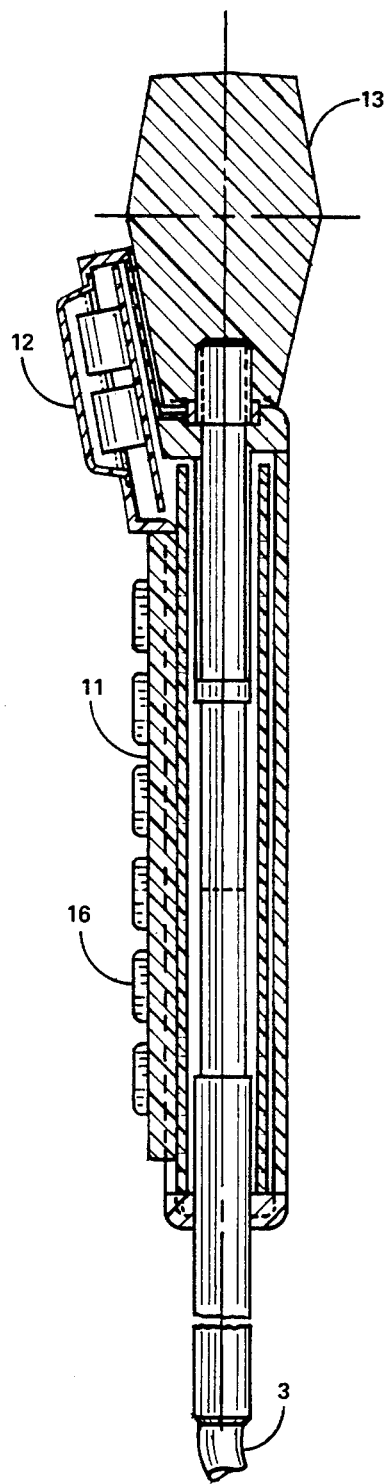
FIG. 6 is a side view of the hand-held unit.

To provide a universal hand-held unit which can be operated with either hand, the read head 13 can be rotated 180° so that it will point in either direction, left as shown in FIG. 5 or right (not illustrated). In order to provide a flexible connection between the keyboard display unit and the rotational shaft through which the cable 3 passes to interconnect the read head with the recognition unit, it is necessary that the interconnection between the rotational unit be flexible to survive the rotation of 180°. This is accomplished by having a plug 22 connected to a receptacle 28 (FIG. 7) on the rotational shaft in the recessed portion thereof. Wires 23 are connected to the plug 22, loop around the rotational shaft and are connected with terminals on the circuit board on which the keyboard and display components are mounted. Five wires are required for the battery connection, (positive and ground) and the three wire input/output and clock data lines which are used to communicate between the keyboard display and the recognition unit 2. On the uppermost portion of the rotational unit of shaft 3 is a spring which holds the read head 13 in contact with the top portion of the body 20. In order to rotate the read head, the read head is pulled away from the body 20 and rotated. Once the rotation is complete the spring will pull the read head back into place and hold it against the body 20. Accidental rotation of the read head is prevented by the display housing which extends up against one side of the read head when the read head is in its lower position. The read head must be pulled above the display before it can be rotated.

Figure 7:
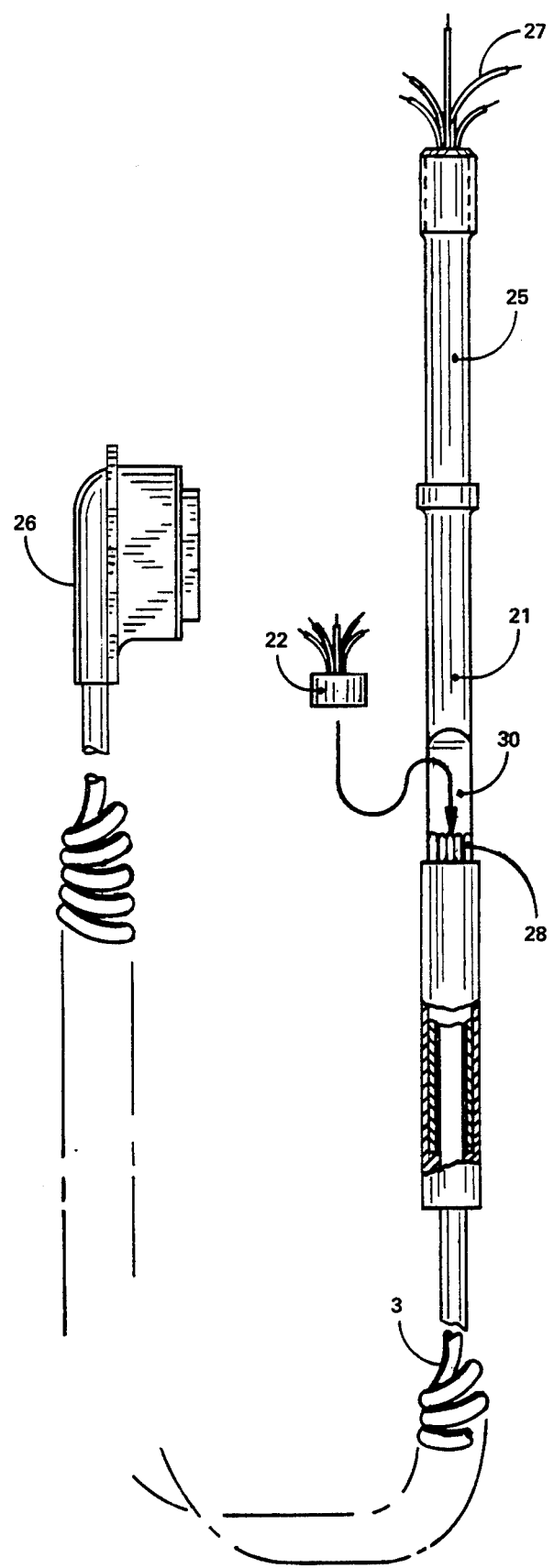
FIG. 7 is an illustration of the rotational unit illustrating the interconnection between the rotational unit, the portable recognition unit and internal circuitry of the hand-held unit.

A more detailed view of the rotational unit is illustrated in FIG. 7 wherein the plug 22 is shown to mate with the connector 28 in recess 30. The spring, not illustrated, resides around the shaft at 25, the lead wires 27 extend up into the read head are interconnected to the electronics therein and extend out the other end for connecting with the recognition unit 2 through the cable 3 and plug 26.

It is possible that the cable 3 could be replaced with a receive/transmit unit in the hand-held unit and the recognition control unit. Small data relay transmit/receive units are well known and need not be covered in detail.

Figure 1:
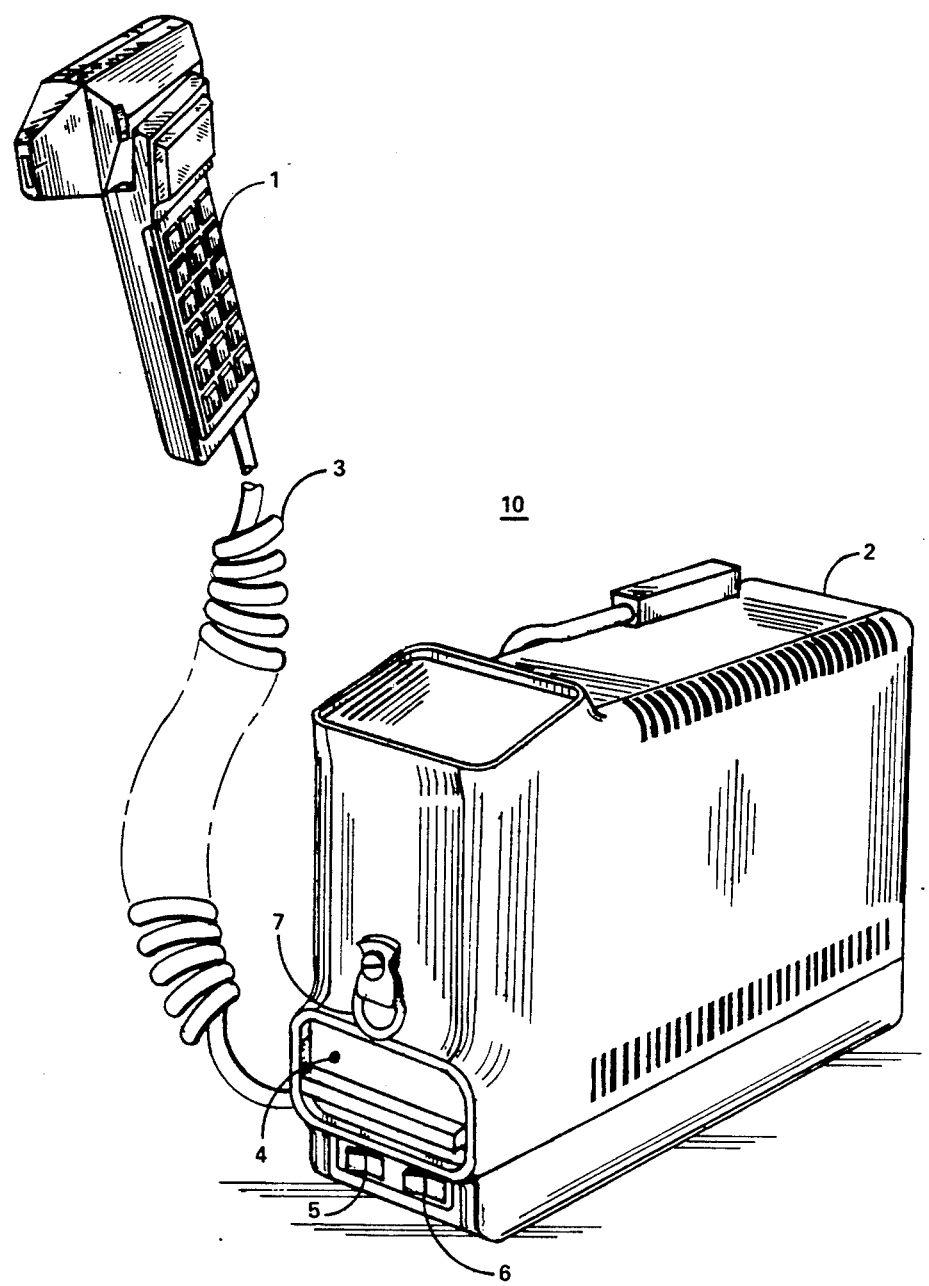
FIG. 1 illustrates a pictoral view of the total data entry hand-held unit and the portable recognition unit.
Figure 8:
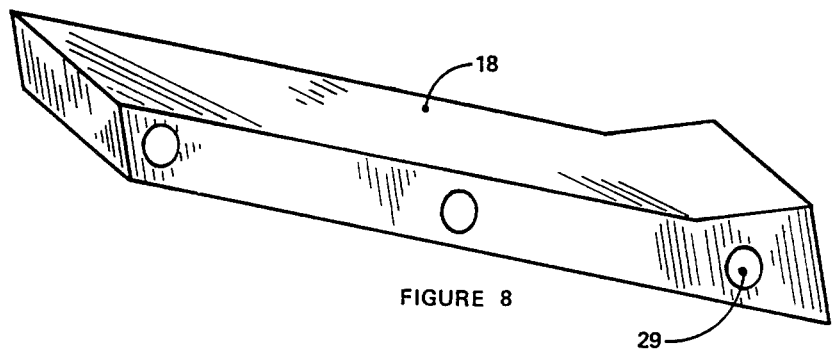
FIG. 8 is a pictoral view of the light pipe used to transmit the cotnrol signal to and from the writ document.
Figure 9:
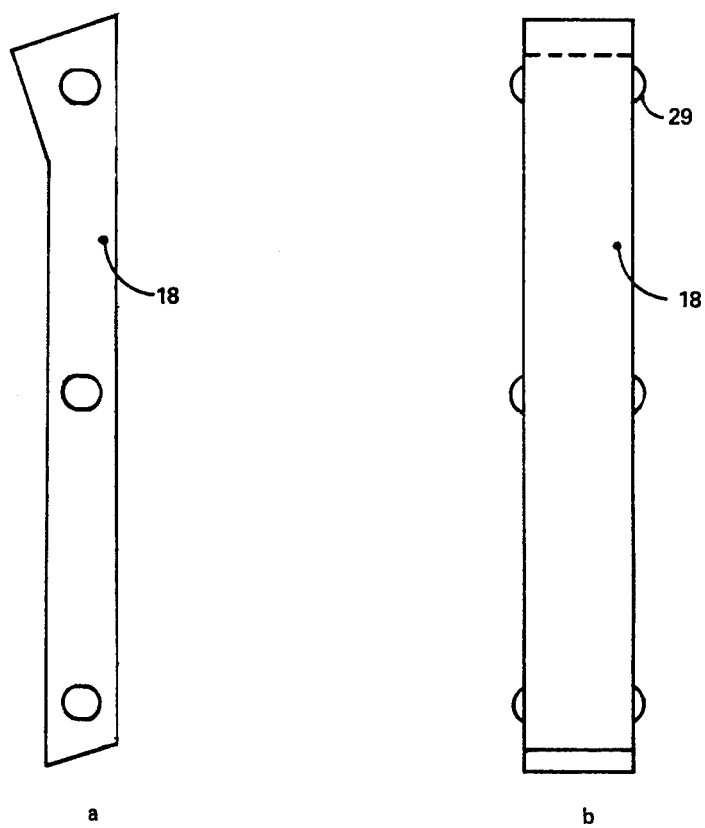
FIGS. 9a and 9b are top and side views of the light pipe of FIG. 8.

A more detailed view of the light pipe used in conjunction with turn on/off circuit is illustrated in FIGS. 8 and 9. FIG. 8 is a pictoral view of the light pipe and FIGS. 9a and 9b are side and top views.

Normally in light pipes of this nature, multifiber optical bundles are used. However, such a light pipe does not lend itself to high volume low cost production. The light pipe illustrated is made by injection molding with acrylic plastic. The light pipe is a homogeneous material as opposed to individual glass fibers. In order to impart a mirror finish to the sides of the light pipe the mold has a 16 microinch finish or better. One advantage of this type of light pipe is that only one inexpensive part is needed to perform the function.

The surfaces of the light pipe are highly polished providing essentially total internal reflection. Therefore, light energy in the pipe is conducted from input to output with relatively low loss. Referring to FIGS. 3 and 5, energy from the emitter/receiver sensor 19 is conducted through the light pipe to the document and reflected energy is transmitted back through the light pipe to the sensor. The sensor is mounted on the main read head frame while the light pipe is in the nose cone. The pipe permits removal of the nose without any electrical connection between the nose and the main read head body. The pipe may be used with any non coherent light where the energy source or receiver is remotely located.

In order to mount the light pipe without the exterior walls coming into contact with a surface which may interfere with the internal reflectivity of wall, mounts 29 are formed on the sides of the light pipe and are used to prevent undesirable contact of the walls with surrounding structures.

The above described invention relates to a total data entry hand-held unit which optically reads data. When the data cannot be read optically, the same unit having a keyboard thereon is used to encode data into the system. The encoded data is displayed for verification.

In order to provide for either left hand or right hand use of the unit, the read head may be rotated through 180° so that it points either to the right or left of the keyboard display body. A rotational strain relief unit is provided within the body to permit internal connections with the keyboard and display without damaging the interconnections.

Having described the invention in connection with certain specific embodiments it is to be understood that further modifications may now suggest themselves to those skilled in the art and is intended to cover such modifications as fall within the scope of the appended claims.

What is claimed is:

1. A light conductor comprising an elongated homogeneous plastic material of generally rectangular cross section at one end and along the principal length of the conductor and an enlarged cross section at the end opposite said one end, a plurality of mounting members homogeneous with said conductor and extending from two opposite non-adjacent sides of the conductor and a mirror finish on the surface of said conductor which is equivalent to at least a 16 microinch finish.

2. The conductor according to claim 1 wherein the large cross section at the opposite end of said conductor decreases along the conductor until it is the same as the cross section along the principal length of the conductor.

3. The light conductor according to claim 1 wherein the material is injection molded arcylic plastic.

4. The light conductor according to claim 1 wherein the projections extending from the sides of the light conductor extend from two opposite sides of the light conductor are in the form of partial spheres.

* * * * *